United States Patent [19]
Loran

[11] 4,188,434
[45] Feb. 12, 1980

[54] LUBRICANT FOR A MAGNETIC MEMBER

[75] Inventor: Thomas J. Loran, Boulder, Colo.

[73] Assignee: Storage Technology Corporation, Boulder, Colo.

[21] Appl. No.: 906,022

[22] Filed: May 15, 1978

[51] Int. Cl.² .................. H01F 1/26; B32B 27/28
[52] U.S. Cl. .................. 428/65; 252/54.6; 364/134; 364/135; 427/131; 427/128; 427/426; 428/64; 428/216; 428/422; 428/900; 428/484
[58] Field of Search .......... 428/64, 65, 900, 484, 428/422, 216; 427/131, 128, 202, 426; 364/134, 135; 252/54.6; 358/128; 179/100.1 B

[56] References Cited

U.S. PATENT DOCUMENTS

| | | | |
|---|---|---|---|
| 2,654,681 | 10/1953 | Lueck | 428/900 |
| 3,387,993 | 6/1968 | Flowers | 428/900 |
| 3,466,156 | 9/1969 | Peters | 428/458 |
| 3,490,946 | 1/1970 | Wolff | 428/900 |
| 3,523,086 | 8/1970 | Bisschops | 428/900 |
| 3,689,317 | 9/1972 | Akashi | 428/900 |
| 3,704,152 | 11/1972 | Hartmann | 252/56 R |
| 3,778,308 | 12/1973 | Roller | 428/421 |
| 3,862,860 | 1/1975 | Pardee | 427/352 |
| 3,919,719 | 11/1975 | Wright | 428/900 |
| 3,993,824 | 11/1976 | Shirahata | 428/900 |

*Primary Examiner*—Ellis P. Robinson
*Attorney, Agent, or Firm*—Woodcock, Washburn, Kurtz, Mackiewicz & Norris

[57] ABSTRACT

A magnetic record, such as a magnetic disc, has a smooth continuous layer of solid lubricant mixed with liquid lubricant. The lubricating layer is applied by spraying the magnetic record with a carrier in which the solid and liquid lubricants are dissolved. In the preferred embodiment, tetrafluoroethylene telomer, a solid lubricant, is applied to a magnetic disc and then buffed. Perfluoroalkylpolyether, a liquid lubricant, is then applied and buffed. The lubricants are dissolved in a carrier of trichlorotrifluoroethane.

12 Claims, 2 Drawing Figures

LUBRICANT FOR A MAGNETIC MEMBER

BACKGROUND OF THE INVENTION

This invention relates to lubricants for dynamic information storage members and, more particularly to the use of solid and liquid lubricants and the method of applying them to a record medium.

Magnetic record members, such as discs and tapes, are operated at extremely high speeds in data processing systems. A lubricant is either included in the magnetic recording medium or it is applied as a very thin layer over the recording medium to reduce friction and protect the surface against head contact.

In magnetic disc systems, the heads normally "fly" on an air film immediately above the magnetic surface. When the disc starts to rotate or when it is stopped, the low friction lubricating layer provides smooth head takeoffs and landings. Also, the low friction lubricating layer protects the recording medium against crashes caused by particles or debris on the disc and which may upset the flying characteristics of the head. Where the head contacts the magnetic surface before stability occurs, this contact should take place on a low friction layer which will restore stability faster and which will protect the fragile head and magnetic surface.

U.S. Pat. No. 3,862,860 Pardee et al describes solid lubricants including tetrafluoroethylene telomer for magnetic records. Solid lubricants have not been completely successful in data processing applications, such as magnetic discs, because the solid lubricating layer interferes with the sensitive magnetic transducing process and because the solid lubricant wears away in tracks under the head.

Liquid lubricants have been successfully used on magnetic records in data processing applications. For example, U.S. Pat. Nos. 3,778,308 Roller et al and 3,919,719 Wright et al describe the use of a liquid lubricant perfluoroalkylpolyether, which is sold under the trade name KRYTOX ®. Such a liquid lubricant has the advantage that it will creep across the surface, thereby replenishing a portion of the layer which has been removed by abrasion or wear. At room temperatures, this liquid lubricant will protect the surface of the magnetic record for the desired lifetime. However, under higher operating temperatures, or long life applications the lubricant evaporates, thereby reducing the protection. The use of higher viscosity, longer chain molecules of perfluoroalkylpolyether prolongs the life of the lubricant because the evaporation rate is less. However, these higher viscosity lubricants sometimes cause the magnetic head to stick to the magnetic surface when stationary. Upon starting up, the head or recording surface may be torn.

It is an object of the present invention to obviate the disadvantages of prior art magnetic record lubricants by applying both solid and liquid lubricants.

RELATED APPLICATIONS

Application Ser. No. 905,946, Loran and Altobellis, filed concurrently herewith, describes the method and apparatus for applying a lubricating layer to the magnetic record. This disclosure is incorporated herein by reference.

SUMMARY OF THE INVENTION

In accordance with this invention, solid and liquid lubricants are applied separately or together as a coating on magnetic members, such as discs and tapes. This combination provides a long life lubricant under high temperature operating conditions. The use of both solid and liquid lubricants produces a synergistic increase in the life of the protective coating which is greater than can be obtained with a corresponding coating of either solid or liquid lubricant. As used herein, the term "solid lubricant" shall mean an organic material that is solid at ambient temperatures and soluble in the carrier used. After the carrier evaporates the solid lubricant forms a more or less continuous film on the substrate.

The lubricants are applied by dissolving them in a carrier which is a solvent individually or for both. By spraying this on record surfaces and then evaporating the carrier, a smooth continuous uniform layer of solid and liquid lubricants is formed. Other solution coating techniques including flow coating, brushing, dipping, doctoring and other well known methods can also by used.

In accordance with this invention, a particularly suitable combination is perfluoroalkylpolyether liquid lubricant and tetrafluoroethylene telomer solid lubricant dissolved in trichlorotrifluoroethane as a carrier.

The foregoing and other objects, features and advantages of the invention will be better understood from the following more detailed description and appended claims.

DESCRIPTION OF A PREFERRED EMBODIMENT

Figure 1:
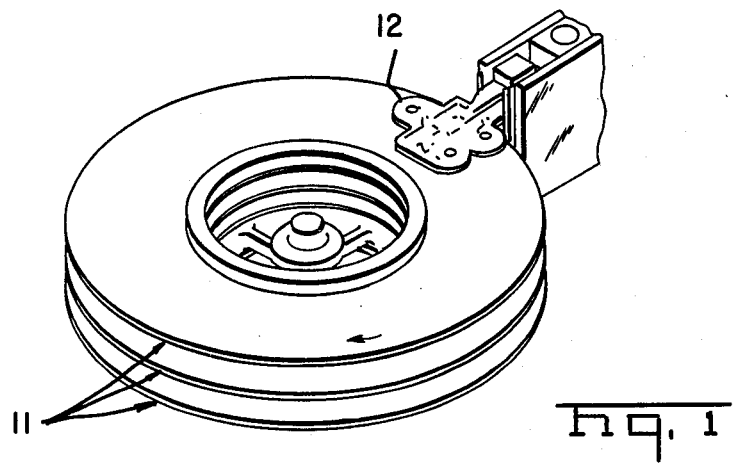
FIG. 1 depicts a magnetic disc subsystem.

FIG. 1 shows a magnetic disc subsystem including a plurality of magnetic records which, in this case, are discs 11 having separate top and bottom record surfaces. These are moved past flying heads 12 for recording and reproducing data.

Figure 2:
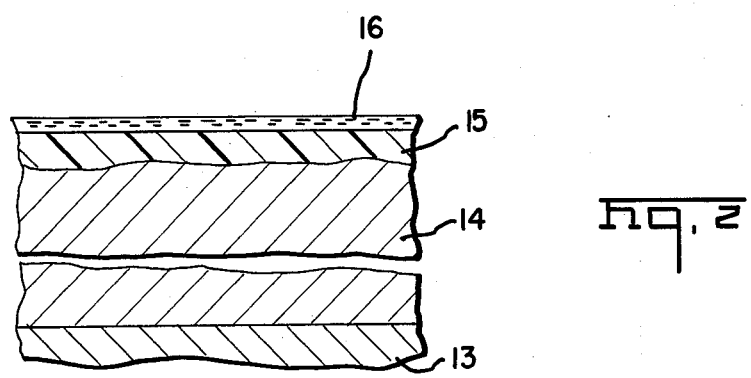
FIG. 2 depicts a cross-section of the magnetic record having a lubricating layer.

FIG. 2 shows a cross-section of a magnetic disc which includes the substrate 13 which may typically be an aluminum alloy. The magnetizable layer 14 includes magnetic particles in a binder. Typically, this layer is approximately 50 microinches thick.

In accordance with this invention, thin, uniform, continuous layers of solid lubricant 15 and liquid lubricant 16 cover the magnetizable layer 14.

Preferably, a layer of solid lubricant 15 is first applied and buffed. Then, a layer of liquid lubricant 16 is applied and buffed.

Layers 15 and 16 are preferably each approximately one microinch thick, but good results may be obtained with a layer which is between one/tenth microinch and twenty microinches thick.

In accordance with another embodiment of this invention, the solid and liquid lubricants are mixed in a carrier and applied to the magnetic record member simultaneously. The lubricants are dissolved in a carrier of trichlorotrifluoroethane.

One mixture particularly suitable for use is perfluoroalkylpolyether liquid lubricant and tetrafluoroethylene telomer solid lubricant in the proportions of approximately one to one. However, good results can be obtained with ratios ranging from one/tenth to one to a ratio of one to one/tenth by weight.

One perfluoroalkylpolyether suitable for use is commercially available from E. I. duPont de Nemours & Co. under their trade name "KRYTOX®". These fluorinated lubricants are described in that company's Technical Bulletin "KRYTOX® 143, Fluorinated Oils, No. L6." A solid lubricant suitable for use is commercially available under the trade name "VYDAX AR." The solid lubricant should be decanted or otherwise purified so that no particles are in the solution. U.S. Pat. No. 3,862,860 describes a suitable purification technique.

Other liquid lubricants which are suitable for use include chlorofluorocarbons such as described in Halocarbon Products Bulletin, refined hydrocarbons such as Biddles' Apezon C, synthetic hydrocarbons, ethers and esters, described in William F. Nye Bulletins. Other solid lubricants which are suitable for use include waxes, including synthetic and natural waxes such as Petrolite Corp. Bulletins 200, 300 and 400. U.S. Pat. No. 3,466,156—Peters et al describes a solid wax lubricant which is suitable for use.

A fatty acid solid lubricant, such as described in U.S. Pat. No. 3,704,152—Hartmann et al is suitable for use.

U.S. Pat. No. 3,319,012—Reed et al describes the use of polytetrafluoroethylene which is suitable for use as a solid lubricant in accordance with this invention.

The carrier should be solvent for both the liquid and solid lubricants. Trichlorotrifluoroethane (Freon) is a particularly suitable carrier when the preferred perfluoroalkylpolyether liquid lubricant and tetrafluoroethylene telomer solid lubricant are used. It has been found that a mixture of approximately 99.5% carrier and 0.5% or less lubricant is particularly suitable for spray coating magnetic discs, although mixtures containing as much as 10% and as little as 0.1%, or less, have been found to be useful for some purposes. When the carrier evaporates, a smooth continuous layer of lubricant remains.

Anti-static agents may be added to the lubricants. Examples of anti-static agents suitable for use are amine types, such as that sold under the trade name "Armostat 310" manufactured by Armak Chemical Division and ester type, such as that sold under the trade name "Drewplast 017," manufactured by PVO International, Inc.

While the invention has been found to be particularly advantageous for magnetic discs and magnetic tapes, the invention is also applicable to other magnetic members which are subject to wear, such as magnetic heads.

EXAMPLES

Example

1. Magnetic Discs.

Five 14" magnetic discs made by Minnesota Mining and Manufacturing Co. were coated. The lubricants were in a solution with Freon TF as a carrier. The spraying was carried out so that approximately 7 milligrams of lubricant were laid down in 10 seconds of spraying with a 0.25% solution. This resulted in a final coating thickness of approximately three microinches. Approximately 3.5 millograms of lubricant were laid down in 10 seconds of spraying with a 0.125% solution. Hand buffing was carried out on each sample by the same person for twenty seconds with the disc spinning at 1200 rpm's, using Texwipes TX 309 cloth. The discs were wear tested for lubricant life by applying a 3/8" diameter aluminum oxide ball mounted on an aluminum arm with a pre-load weight of 80 gm. The discs were rotated at 100 rpm. When the ball breaks through the lubricant layer, there is an audible vibration. The time to this failure was measured for each disc.

| TIME TO FAILURE ON PIN WEAR TESTER | DISC NO. | DESCRIPTION OF LUBRICATION PROCESS |
|---|---|---|
| 75 (min) | T 1 | Spray 0.25% solution Krytox AD for 10 seconds. Hand buff. |
| 69 | T 2 | Spray 0.125% solution Krytox AD for 10 seconds. Spray 0.125% solution Vydax for 10 seconds. Hand buff. |
| 94 | T 3 | Spray 0.25% solution Vydax for 10 seconds. Hand buff. |
| 760 | T 4 | Spray 0.125% solution Vydax for 10 seconds. Hand buff. Spray 0.125% solution Krytox AD for 10 seconds. Hand buff. |
| 117 | T 5 | Spray 0.25% solution of 50—50 Vydax and Krytox AD for 10 seconds. Hand buff. |

Tests designated T 1 and T 3 are for a liquid lubricant by itself and a solid lubricant by itself respectively. Test T 4 wherein the disc was first coated with solid lubricant and then coated with liquid lubricant, demonstrates the exceptionally large increase in wear life brought about by this invention. The wear life is ten times longer than that obtained with the corresponding liquid lubricant by itself (Test T 1) and eight times as long as the wear life of the corresponding solid lubricant by itself (Test T 3). Test 5 demonstrates that a mixture of solid and liquid lubricants gives a better wear life than either the solid lubricant by itself or the liquid lubricant by itself. Test T 2 shows that where the liquid layer was applied first and then the solid lubricant layer was applied, the wear life is actually decreased. This is unacceptable for magnetic discs for which increase in wear life is more important than lowering the coefficient of the friction. Coefficient of friction tests were performed on the above five discs by measuring the slide angle of a piece of steel with three magnetic heads. The total load was 30 grams with approximately ten grams for each head. Coefficients of friction were:

| UNLUBRICATED DISC | .18 |
|---|---|
| T 1 | .16 |
| T 2 | .11 |
| T 3 | .12 |
| T 4 | .18 |
| T 5 | .19 |

Discs T 4 and T 5 show practically no change in coefficient of friction over the unlubricated disc. However, this coefficient of friction is suitable for operation of magnetic discs.

Example

2. Magnetic Tapes.

3M Type 177 1/4" Low Noise Magnetic Tape was coated with 4-8 microinches (total thickness) of lubricants. The coefficient of friction was tested by the inclined plane tests described in SMPTE Journal, Vol. 80, September 1971, pp. 734-739.

|  | CONDITION | COEFFICIENT OF FRICTION |
|---|---|---|
| Sample 1 | Untreated | above 0.3 |
|  | Vydax (solid) | 0.2 |
|  | Krytox (liquid) | 0.15 |
|  | Vydax + Krytox | 0.15 |
| Sample 2 | Untreated | above 0.3 |
|  | Ester (solid) | 0.17 |
|  | Krytox (liquid) | 0.20 |
|  | Ester + Krytox | 0.08 |

The lowering of the coefficient of friction is extremely important in coating magnetic tape. There is a large area of wear between magnetic tape and a magnetic head. Reduction of friction at this interface is important. The above tests show that a mixture of solid and liquid lubricant is effective in reducing the coefficient of friction.

While particular embodiments of the invention have been shown and described, various modifications are within the true spirit and scope of the invention. The appended claims are intended to cover all such modifications.

What is claimed is:

1. A magnetic record member for recording and reproducing signals therefrom comprising:
   a substrate of said magnetic record member; and
   a smooth continuous layer of solid lubricant on said substrate, a smooth continuous layer of luquid lubricant on top of the layer of solid lubricant, each of said layers having a thickness of between 1/10 microinches and twenty microinches.

2. The magnetic record member recited in claim 1 wherein said solid and liquid lubricants are mixed in the ratio ranging from about 0.1:1 to about 1:0.1 by weight.

3. The magnetic record member recited in claim 1 wherein solid and liquid lubricant are mixed in the ratio of approximately 1:1 by weight.

4. The magnetic record member recited in claim 1 wherein said liquid lubricant is perfluoroalkylpolyether.

5. The magnetic record member recited in claim 1 wherein said solid lubricant is tetrafluoroethylene telomer.

6. The magnetic record member recited in claim 1 wherein said liquid lubricant is selected from the group comprising: fluoroalkylpolyethers, chlorofluorocarbons, refined and synthetic hydrocarbons and ethers.

7. The record member recited in claim 1 wherein said solid lubricant is selected from the group including waxes, tetrafluoroethylene telomer, and tetrafluoroethylene.

8. The method of lubricating a magnetic record member comprising:
   providing a magnetic record member substrate;
   dispersing solid lubricant in a carrier;
   dispersing liquid lubricant in a carrier; and
   spraying said solid lubricant, and said liquid lubricant, and their carrier onto said substrate in separate layers with the liquid lubricant on top of a layer of solid lubricant on said substrate, the thickness of each of said layers being between 1/10 microinches and twenty microinches.

9. The method recited in claim 8 wherein perfluoroalkylpolyether liquid lubricant and tetrafluoroethylene telomer solid lubricant are dissolved in trichlorotrifluoroethane carrier.

10. The method recited in claim 8 wherein said layer of solid and liquid lubricants includes anti-static agents.

11. The method recited in claim 8 further comprising: buffing after the application of each layer.

12. The method recited in claim 8 wherein said member is a magnetic recording disc.

* * * * *